United States Patent
Overbury

[11] 3,895,323
[45] July 15, 1975

[54] TRACKING FILTER WITH LOCK-ON ASSURANCE FOR DOPPLER NAVIGATION SYSTEM

[75] Inventor: Francis G. Overbury, Cuffley, England

[73] Assignee: International Standard Electric Corporation, New York, N.Y.

[22] Filed: Oct. 7, 1974

[21] Appl. No.: 512,439

[52] U.S. Cl. .................................. 333/17; 333/76
[51] Int. Cl.² .......................................... H03H 7/10
[58] Field of Search ............ 333/17, 76; 334/16, 17, 334/20, 26; 325/174, 177; 343/100 M

[56] References Cited
UNITED STATES PATENTS

| | | |
|---|---|---|
| 3,281,722 | 10/1966 | Hellwarth .............................. 333/17 |
| 3,337,823 | 8/1967 | Anderson .............................. 334/26 |
| 3,475,702 | 10/1969 | Ainsworth .............................. 333/17 |

*Primary Examiner*—Paul L. Gensler
*Attorney, Agent, or Firm*—William T. O'Neil

[57] ABSTRACT

A frequency selective filter arrangement particularly adapted for inclusion in radio navigation systems in which a received signal contains the frequency analog signal corresponding to sought angular information as well as undesired frequency components of inherently lower amplitude. A first voltage present across a parallel resonant circuit is compared to a signal representative of the current through said resonant circuit and a control signal is developed to tune the resonant circuit whenever the comparison indicates lock-on to a lower amplitude spurious signal.

7 Claims, 1 Drawing Figure

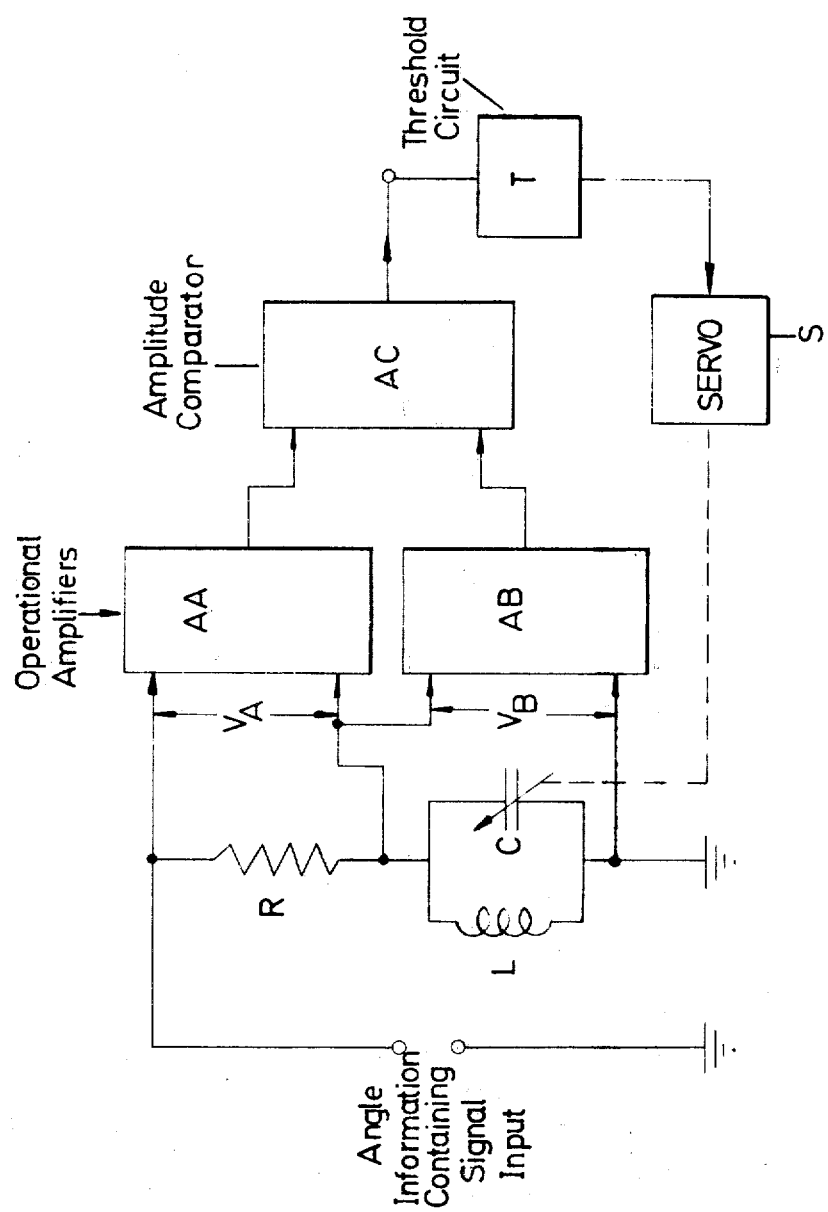

TRACKING FILTER WITH LOCK-ON ASSURANCE FOR DOPPLER NAVIGATION SYSTEM

BACKGROUND OF THE INVENTION

1. Field of the Invention

This invention relates to a frequency selective filter arrangement, with particular, but not exclusive, application in radio navigation systems where bearing information is coded in terms of frequency.

2. Description of the Prior Art

In known radio navigation systems, a frequency selective network is commonly tracked to follow the major frequency spectrum, this spectrum being associated with the sought bearing value. However, there is the possibility of false tracking on a spurious frequency component, albeit smaller than the sought bearing frequency. The manner in which the present invention deals with this problem will be evident as this description proceeds.

SUMMARY OF THE INVENTION

An object of the invention is to eliminate the tracking of an unintended or spurious frequency component, and to insure that the network is locked to the major frequency component, i.e., the component which is the analog of a sought value (bearing for example).

According to the invention there is provided a frequency tracking filter arrangement for acquiring, from within a multi-frequency component input signal, the major component thereof. The apparatus includes a parallel resonant filter circuit, means for comparing a first voltage across the filter representative of the required component, with a second voltage proportional to the current feed to the filter representative of the frequency components outside the acquisition range; and means for enabling further tracking of the filter when said comparison indicates that said second voltage is greater than said first voltage.

The comparison is used to insure that acquisition has truly taken place on the major frequency component, since with correct acquisition, the voltage across the filter (first voltage) is greater than the second voltage. With incorrect acquisition the inverse condition obtains, and the arrangement is retracted, either by altering the center frequency of a variable frequency filter; or when using a fixed frequency filter, by altering the frequency of a local oscillator which brings the frequency of the incoming signal to this fixed frequency.

The invention will be more clearly understood from the following description in conjunction with the accompanying drawing.

BRIEF DESCRIPTION OF THE DRAWING

The single drawing FIGURE depicts a circuit diagram of a frequency tracking filter arrangement embodying the invention.

DESCRIPTION OF THE PREFERRED EMBODIMENT

The arrangement shown in the FIGURE may form part of a radio navigation receiver in a Doppler directional guidance system, e.g., a microwave landing guidance system, wherein the ground transmitter beacon is as described in British Pat. No. 1,234,541.

Such a receiver derives angular data, e.g., elevation, information from the received signal by suitable processing of the RF signal to obtain a Doppler beat frequency which is unique for a given elevation angle with respect to the beacon.

A wideband filter (not shown, but known in this art) passes all received signals which fall within the total sector of possible angles, but inevitably this acceptance of a wide range of spectral components results also in acceptance of multi-path components derived from unwanted reflections falling within the passband of the filter.

Accordingly, it is necessary not only to track a narrow-band filter through the frequency band to acquire and lock into the required bearing frequency, but also to verify that the filter has acquired the correct frequency and not an unwanted multi-path signal.

The manner in which this verification is achieved will now be described. The received angle information containing signal is applied to a suitable frequency tracking filter, shown as comprising a parallel resonant variable capacitance LC circuit. With a servo or other suitable arrangement for varying C to track the center frequency of the filter through the required range, assume that at a given frequency, resonance occurs, indicating that the filter has (or apparently has) acquired the bearing signal. In the parallel resonance condition the voltage $V_B$ across the filter peaks to a maximum value, while the current fed to the filter falls to a minimum value corresponding to maximization of the parallel resonant circuit impedance. Accordingly, the voltage $V_A$ across series resistor R falls to a minimum value.

A parallel resonant circuit exhibits a maximum terminal impedance at its resonant frequency, but draws current (because of a lower terminal impedance) at other frequencies.

The voltage $V_B$ across the filter is representative of the acquired component, while the voltage $V_A$ is proportional to the current fed to the filter and is representative of the frequency components of bearings outside the acquisition range.

If $V_B$ is greater than $V_A$, acquisition is correct, i.e., on the major frequency component. If $V_A$ is greater than $V_B$, acquisition is incorrect, the major frequency component lying outside the acquired frequency.

By feeding the respective voltages as inputs to operational amplifiers AA and AB, and the outputs of these amplifiers to an amplitude comparator AC, the relationship between $V_A$ and $V_B$ is determined. With $V_A < V_B$, correct acquisition is verified, but with $V_A > V_B$, acquisition is incorrect and the comparator output controls searching of the filter until correct acquisition is verified. This particular function is not unlike the mechanism of automatic frequency control.

In a practical circuit realizing the above described verification process, the $V_A/V_B$ relationship may include a separation threshold and/or a time delay to prevent immediate reversion to a searching mode by the filter if a temporary "flash" of higher amplitude multi-path signal should momentarily occur.

Instead of a variable frequency filter, a fixed frequency filter may be used in conjunction with a variable frequency local oscillator to bring the received signal to the filter frequency.

The servo element S is not necessarily a mechanical device, electronic variable capacitors being well known per se.

It is to be understood that the foregoing description of specific examples of this invention is made by way of example only and is not to be considered as a limitation on its scope.

What is claimed is:

1. A frequency tracking filter arrangement for acquiring within a multi-frequency component input signal, the major component thereof, comprising:
   a parallel resonant filter circuit;
   comparison means for comparing a first voltage across the filter and representative of the acquired component with a second voltage proportional to the current fed to the filter and representative of the frequency components outside the acquisition range;
   and means responsive to the output of said comparison means for causing further searching of the filter when said comparison indicates that said second voltage is greater than said first voltage.

2. Apparatus according to claim 1 in which said filter circuit is of a variable resonance frequency type.

3. Apparatus according to claim 2 further defined in that control means are included and are responsive to said comparison means to generate and apply a control signal to said variable resonance frequency filter.

4. Apparatus according to claim 3 in which said control signal operates to vary the frequency of said variable resonance frequency filter.

5. Apparatus according to claim 4 in which said filter comprises a parallel resonant circuit, and a resistance, and in which said multi-frequency component input signal is applied across the series combination of said parallel resonant circuit and said resistor, said first voltage being that across said parallel resonant circuit and said second voltage being that across said resistor.

6. Apparatus according to claim 5 in which said parallel resonant circuit includes at least one variable reactive element responsive to said control signal to vary the resonant frequency of said parallel resonant circuit.

7. Apparatus according to claim 6 including a threshold circuit operatively connected to said comparison means to limit the generation of said control signal to situations in which the difference between said first and second voltages exceeds a predetermined amount.

* * * * *